United States Patent

[11] 3,607,168

[72] Inventor John J. Grady
New Florence, Pa.
[21] Appl. No. 826,779
[22] Filed May 6, 1969
[45] Patented Sept. 21, 1971
[73] Assignee International Steel Slag Corporation
Pittsburgh, Pa.
Continuation of application Ser. No.
535,143, Mar. 17, 1966, now abandoned,
which is a continuation-in-part of
application Ser. No. 126,792, June 28,
1961, now abandoned, which is a
continuation-in-part of application Ser. No.
428,519, Jan. 27, 1965, now Patent No.
3,316,075, dated Apr. 25, 1967, which is a
continuation of application Ser. No.
485,037, Sept. 3, 1965, now abandoned,
which is a continuation-in-part of
application Ser. No. 304,932, Aug. 27,
1963, now abandoned.

[54] STEEL SLAG HANDLING SYSTEM AND METHOD FOR USING SAME
26 Claims, 3 Drawing Figs.

[52] U.S. Cl...................................................... 65/19,
65/20, 65/141, 264/11

[51] Int. Cl......................................................... C03b 19/08
[50] Field of Search............................................ 65/19, 20,
141; 264/11

[56] References Cited
UNITED STATES PATENTS
1,888,394  11/1932  Schol............................ 65/141
3,316,075  4/1967   Grady........................... 65/19
3,374,999  3/1968   Burch............................ 65/141

Primary Examiner—S. Leon Bashore
Assistant Examiner—Robert L. Lindsay, Jr.
Attorney—LeBlanc and Shur ABSTRACT: There is disclosed herein apparatus and method for handling molten steel slag produced in a steelmaking furnace by cooling and granulating the slag on a continuous basis through interception of a stream of molten slag with a jet stream of water having particularly specified characteristics of shape, velocity and flow, and transportation of the granulated slag to a remote location as a slag/water slurry.

FIG.1

STEEL SLAG HANDLING SYSTEM AND METHOD FOR USING SAME

This application is a continuation of my earlier filed copending application, Ser. No. 535,143, filed Mar. 17, 1966, and now abandoned, entitled STEEL SLAG HANDLING SYSTEM. Application Ser. No. 535,143, in turn, is a continuation-in-part of my earlier filed copending application, Ser. No. 126,792, filed June 28, 1961, and now abandoned, entitled STEEL SLAG REMOVAL SYSTEM, and also of my copending application Ser. No. 428,519 on STEEL SLAG HANDLING SYSTEM filed Jan. 27, 1965, now U.S. Pat. No. 3,316,075, issued Apr. 25, 1967 as a continuation-in-part of said application Ser. No. 126,792, and also of my copending application Ser. No. 485,037 filed Sept. 3, 1965, and now abandoned, as a continuation of said application Ser. No. 428,519, and also of my copending application Ser. No. 304,932 filed Aug. 27, 1963, and now abandoned as a continuation-in-part of said application Ser. No. 126,792.

The present invention relates to a system for more efficient, faster and more economical handling and removal of slag discharged from steel-making furnaces. More especially this invention relates to new improved methods and apparatus for converting molten slag discharged from a steel furnace into a granular mixture of ferrous and slag particles of relatively small size and low temperature, and rapidly removing and transporting the resultant granular mixture from the furnace building by hydraulic means without disrupting (during) the steel-making operation, for reclaiming of usable ferrous material and other suitable disposal at a point removed from the furnace.

For some years, steel in large quantities has most commonly been made in "open hearth furnaces," in which ingredients such as scrap iron, pig iron, hot molten iron from blast furnaces, ore, limestone, etc., are melted and refined to produce molten steel. A substantial quantity of slag is formed over the molten steel bath in the open hearth furnace and plays an important part in the steel-making process. Typically, the slag constitutes about one-fifth of the total charge to the furnace in a heat; hence, in a modern open hearth furnace having a capacity of 350 tons per heat, about 65 to 70 tons of slag are formed and must be disposed of within a relatively short time. Generally, a modern open hearth plant contains 10 to 15 stationary furnaces of 200 to 350 ton capacity, which are substantially continuously operated on staggered heat cycles, so that a tremendous amount of slag must be removed from the furnace building each day. Efficient quick removal of such large quantities of slag from adjacent the steel-making furnaces and out of the furnace building is a longstanding major problem in steel manufacture; and this problem has been greatly accentuated by development of modern techniques making is possible to produce substantially greater quantities of steel per heat in a substantially shorter time with existing furnaces.

For a long time, it has been a common practice in leading mills to discharge steel slag into slag pots removed from the furnace room by rail cars, or equivalent means, to a suitable disposal area where the slag was dumped, whereafter the pots are returned to their aforementioned positions adjacent the furnace.

However, this slag-pot system has proven inadequate and unsatisfactory for removal of greater tonnages of slag in less time, as furnace capacity increased and melt time decreased. Consequently, some leading open hearth steel plants have adopted a system in which part of the slag is "front flushed" from the center furnace door under the furnace to the pit side, and the remainder of the slag is flushed from the steel ladle to the pit floor when the furnace is tapped. Thereafter, "highlift" tractors and heavy-duty trucks are used to remove the slag from the pit side of the open hearth furnace building when the steel ladle is removed after pouring the heat. (This current system is illustrated in FIGS. 1–3 of my aforesaid copending application, Ser. No. 126,792.) With a heat time of about 8 to 8-½ hours for a 350-ton open hearth furnace, about 60 to 70 tons of hot slag must be removed from below and behind the furnace, loaded, trucked to a disposal point, unloaded, etc., in about 1 to 1-½ hours. There are, however, serious shortcomings of this approach which can and do cause loss in furnace operating time, besides the need for substantial equipment and maintenance.

The need for round-the-clock removal of high tonnages of slag has led to use in one of the most modern United States open hearth shops of a "tractor wagon" capable of hauling 30 tons of hot slag, loaded by highlift tractors. This, however, involves problems similar to those involved with the above-mentioned highlift and truck system for handling steel slag (more fully discussed in my aforementioned parent application Ser. No. 126,792 with reference to FIGS. 1–3 thereof).

The problems of handling and removing steel slag have been seriously increased by the steel industry's rapid adoption, within the past few years, of oxygen steel-making furnaces, sometimes called "OSM" or "BOF" furnaces. These furnaces are capable of producing steel in tremendous quantities in short heat times; for example, it is possible to produce 240 or more tons of steel in about 27 minutes, tap to tap (compared to 6 to 8 hours tap to tap for modern open hearth furnaces). However, such oxygen steel furnaces also form large quantities of slag in the order of 12–16 percent of the heat tonnage. Thus an OSM or BOF furnace producing about 250 tons of steel in ½ hour will also generate about 37.5 tons of molten slag in ½ hour. Yet, these vast quantities of molten slag must be removed from the furnace and furnace building in minimal time for charging and running the next heat; and it is important that slag handling and removal not penalize the "tap-to-tap" capacity of the furnace and mill production.

However, the prevailing method of handling and removing molten slag from OSM and BOF furnaces is by use of a multiplicity of costly slag pots moved by cranes and/or rail cars from the furnace to a relatively remote slag dump. These present multistep batch methods of handling OSM or BOF steel slag are not only costly from the viewpoint of slag handling, but also have serious inherent shortcomings limiting useful capacity of the furnaces. Improvement over such prevailing methods of handling and disposing of increasing tonnages of OSM or BOF slag in less time has become critical in minimizing and avoiding production delays which may affect the entire mill, with tremendous economic ramifications.

It has been apparent for some time that the long standing and currently used multiple-step materials-handling systems for handling and removing steel slag have serious inherent limitations which will penalize the furnaces run when at the materially higher tonnage—shorter heat times now feasible.

For some time heretofore, blast furnace and other molten metal slags have been granulated with water; but, granulation of steel slags by similar techniques involves different problems whereby such water granulation of steel slag was found dangerous and/or inoperative. This is summarized in Canadian Pat. No. 562,523 on "Method and Apparatus For Handling Slag Resulting From Steel-Making Operations," issued to Harry V. Tomlinson on Aug. 26, 1958, from an application filed Mar. 17, 1963, and assigned on its face (60 percent) to the Harsco Corporation of Harrisburg, Pennsylvania, a leader in the field of handling steel (and other) slag disposal for United States steel producers, said patent stating:

"My invention, as a primary object, seeks to teach a practical method of granulating slag produced during various steel-making processes by the introduction of a slag while in a molten condition into water, both the slag and the water being controlled in accordance with the teachings of the invention. In this respect the invention should be contrasted with various heretofore known and/or suggested methods of granulating blast furnace slag by the introduction of the same into a stream or bath of water. While it is true that the basic concept of granulating slags by introducing the same into water is old, the present invention, in its most important aspect, is concerned with a particular method of controlling the water and slag during the introduction of the latter into the former whereby the basic process is rendered capable of commercial application in the treatment of steel-making slags."

"It will be readily appreciated by those skilled in the art that slags produced in steel-making operations are tapped from the furnace at a considerably higher temperature than are blast furnace slags. This factor creates an unusual problem in that the higher temperature steel-making slag tends to combine explosively with the water due to the extremely rapid generation of steam and liberation of hydrogen and carbon monoxide gasses. Thus, methods heretofore known to be effective in the granulation of blast furnace slags have been found to be dangerous and/or inoperative when applied to the treatment of steel-making slags."

The aforementioned Harsco Canadian patent seeks to successfully and safely granulate steel slag on a practical commercial basis by pouring the molten slag from an open hearth furnace into a bath of water in a tank, with water fed into the tank below the water-bath surface and as low as one-half way to the bottom of the tank to create a water current in the bath at this level. Contrary to the objectives stated in the Canadian patent, the steel-slag system of the Harsco patent is susceptible to explosion, and is dangerous (if not inoperative), aside from otherwise being impractical and unacceptable from the viewpoint of real-life steel mill operations, for many reasons. In any event, although Harsco is one of the largest handlers of steel slag in the United States, it does not use the Harsco-Tomlinson Canadian patent system for steel slag, at least in the U.S. steel industry so far as can be determined. U.S. steel producers and their slag contractors (including Harsco) continue to use such above-discussed batch-type, multistep, slag handling systems, utilizing slag pots with rail cars, vehicles or cranes, or highlifts with trucks and tractors, etc., in spite of the many shortcomings and problems of such prior systems.

Hence, removal of steel slag by multiple-step batch systems has been and is a "bottleneck" that prevents the maximum utilization of existing OSM and BOF open hearth and steel-making furnaces, thus hindering realization of tremendous economic savings and other advantages, including increase of national defense steel production with existing equipment.

My aforementioned earlier copending applications disclose inventions providing new improved slag handling and removal systems which depart from the materials-handling concepts of current and earlier steel slag systems discussed above, thus avoiding their serious shortcomings and making it possible to achieve fast continuous handling and removal of molten steel slag from open hearth, BOF OR OSM and other steel furnaces. More particularly, inventions of my aforementioned earlier applications provide new improved slag handling methods and apparatus whereby the molten slag from the steel making furnace is discharged to a "granulator" wherein it is suddenly cooled and granulated by jets of water to form relatively small particles which are then transported by continuous conveying means to a suitable reclamation and disposal area at a distance from the steel furnace building. Thus, large tonnages of steel slag produced in a large heat are disposed of in a very short time after the furnace is tapped, so that steel slag handling does not continue as a "bottleneck" preventing shorter heat times and optimum use of large capacity OSM or BOF and open hearth furnaces.

The inventions of my aforementioned earlier copending application provide water jet granulator methods and apparatus having a novel arrangement and mode of operation making it possible to handle large tonnages of molten steel slag in a short time period, without creating explosions, or other dangerous or otherwise undesirable working conditions which the steel industry has heretofore encountered in attempting to granulate steel slag with water. Hence, these inventions increase the safety of slag removal operations, thus furthering the diligent efforts of U.S. steel companies to continuously improve safe working conditions in the mills, which is a matter of prime concern to the U.S. steel industry.

It is a principal object of the present invention to provide a further improved novel steel slag handling and removal system incorporating steel slag granulation inventions disclosed in my aforementioned earlier copending patent applications plus new improved means for hydraulic transport of the granulated slag and ferrous material directly to a distant disposal area for economical separation of reusable ferrous material and disposal of nonferrous slag material. It is a related object of this invention to provide such a new improved steel slag granulation and hydraulic removal and transport system which is very fast in operation, substantially reduces the high per ton cost of currently used slag removal and metal recovery systems, greatly decreases the cost of equipment per ton of slag removed compared to prior slag removal systems, and reduces serious and costly equipment maintenance problems currently encountered.

It is another principal object of the present invention to provide new improved methods and apparatus for granulation of molten steel slag and direct hydraulic transportation of the resultant granulated slag which take into account and balance pertinent factors such as: temperature and viscosity of steel slag discharged into the granulator; the quantity of molten steel slag, and sometimes steel, discharged per minute into the granulator, especially at maximum rate; the angle of the chute (or other means) discharging the slag into the granulator; the size, shape and location of the granulator jet nozzles; the water input to the granulator jets and water jet velocity (e.g., in f.p.s.) and the rate of water input to slag input for a given time period (e.g., g.p.m. water to tons/min. slag); the input water temperature for the granulator jets, and temperature of granulator water output; correlation of the foregoing and the hydraulic transport system construction and mode of operation, including minimum slurry velocity and surge load tolerance in relation to granulator operation based on variable slag loads on the granulator; and incorporation of suitable safeguards in the construction and mode of operation of the overall system.

It is another related principal object to provide a commercially desirable steel slag granulation and hydraulic transport system which not only safely, continuously, and rapidly granulates and removes large tonnages of molten steel slag, but also meets steel-mill operating requirements such as minimal water consumption, minimal steam, suitable control of particle size for economical magnetic separation, ready adaptability to varying type steel furnace slags and varying tonnage disposal rates, and trouble-free operation by semiskilled workers.

Other important objects and advantages of the present invention will be apparent from the following description thereof with reference to the accompanying drawings, and from the claims appended hereto. In the drawings:

As will be apparent from comparing the drawings herein with those in my aforesaid earlier applications, Ser. No. 126,792; Ser. No. 428,519; Ser. No. 485,037 and Ser. No. 304,932, FIG. 1 herein is similar to side elevation FIGS. 5 and 12 of my parent application Ser. No. 126,792 and like FIGS. 2 and 9 in my copending applications Ser. No. 428,519 and Ser. No. 485,037, and also FIG. 1 in Ser. No. 304,932 (but looking at the opposite side of the steel slag granulator system in side elevation).

In the following description, like numerals are used for like parts throughout. To facilitate and abbreviate the description herein, parts of the new improved system shown in FIGS. 1–3 hereof which are the same as in the embodiment of FIGS. 4–13 of my parent application Ser. No. 126,792, and in like FIGS. 1–11 of c-i-p applications Ser. No. 428,519 and Ser. No.

485,037, are identified by like numerals as in said figures of my aforesaid earlier parent applications. Further, modified parts are identified to the extent feasible with like numerals as corresponding parts of the arrangement in said figures of my aforesaid applications Ser. Nos. 126,792; 428,519 and 485,037 plus the subscript "$k$."

Referring to drawing FIG. 1, the numeral 20 generally indicates a typical open hearth steel-making furnace within a building containing a charging floor 24, with an area 26, called the "kitchen," below the charging floor. Details of the open hearth furnaces 20 and related equipment within the open hearth furnace building are not shown or described except to the extent helpful for illustrative discussion of the present invention. For more details see my aforementioned earlier copending applications, and also see chapter 15 of "The Making, Shaping and Treating of Steel," 7th Edition, United States Steel Corporation (1957), and items in the bibliography on pages 332-333 thereof.

The front wall 30 of the open hearth furnace 20 contains a plurality of charging openings 39 (usually five or seven in number); and each of these is covered by a vertically movable charging door (not shown). In a typical open hearth furnace operation, during the steel-making operation, part of the slag overlying the steel bath in the furnace 20 is discharged through a notch or trough cut in the refractory of the front bank of the furnace at the center door opening 39. This "front flush" slag 64 passes through a spillway 66 in the charging floor 24, and normally into a pit 68 below the furnace, which is filled with dirt or debris to form a hill 72, whereby the hot front-flush slag discharged through the opening 66 pours onto "slag grade" 72 and flows down towards the pit side of the furnace as amplified in my above-identified earlier applications. The front flushing of slag may continue for 1 to 1-½ hours in good operating practice with a 350-ton furnace; but, at times, slag is front flushed at a very high rate, estimated as high as 4 tons per minute.

Figure 1:
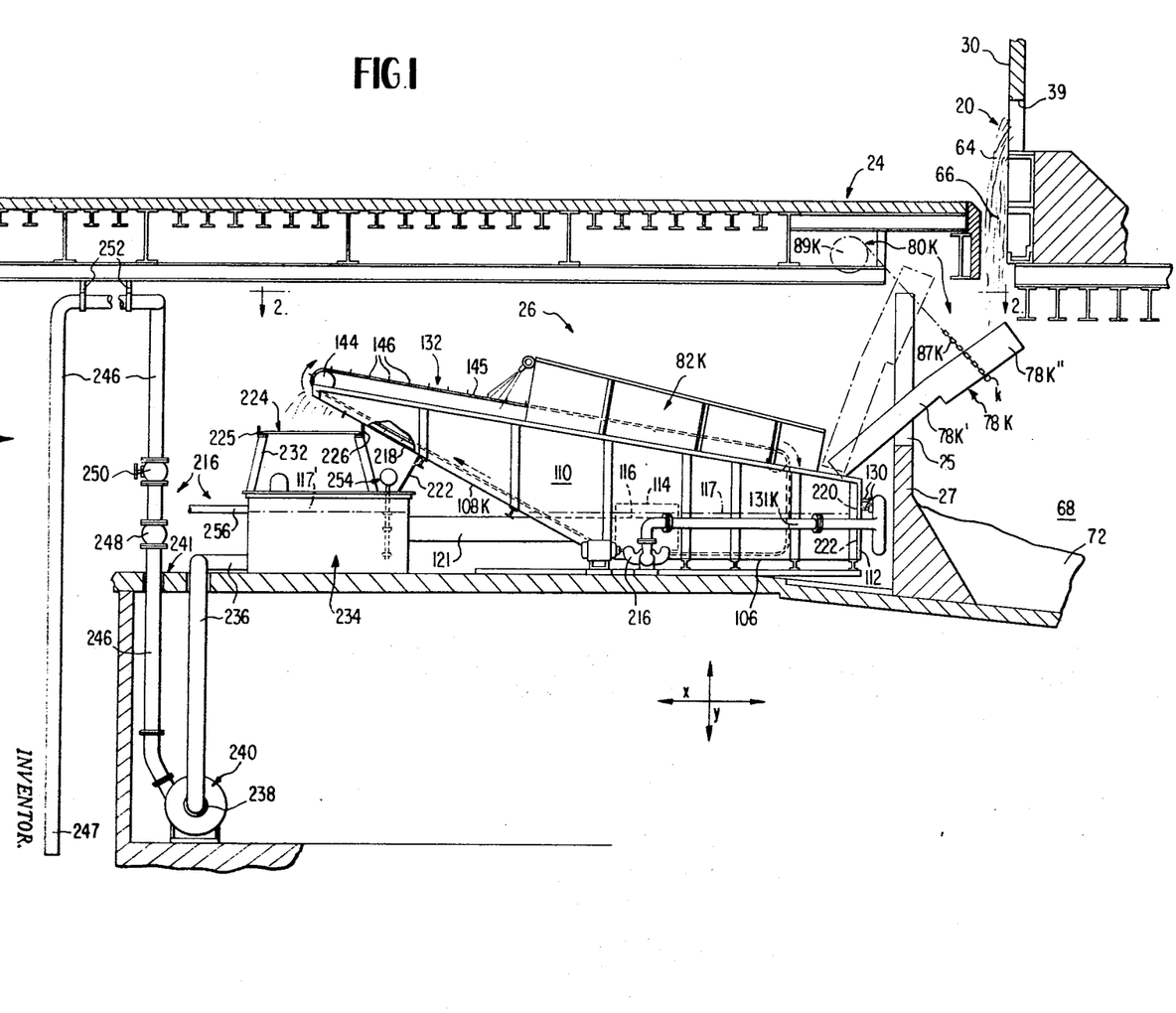
FIG. 1 is a diagrammatic cross section of a steel-making furnace (of open hearth type, along a line through the tap spout) showing an embodiment of the steel slag handling and removal system of this invention, including a granulator for converting molten steel discharged into it, and a hydraulic system for conveying the granulated slag after removal of oversize pieces.
Figure 2:
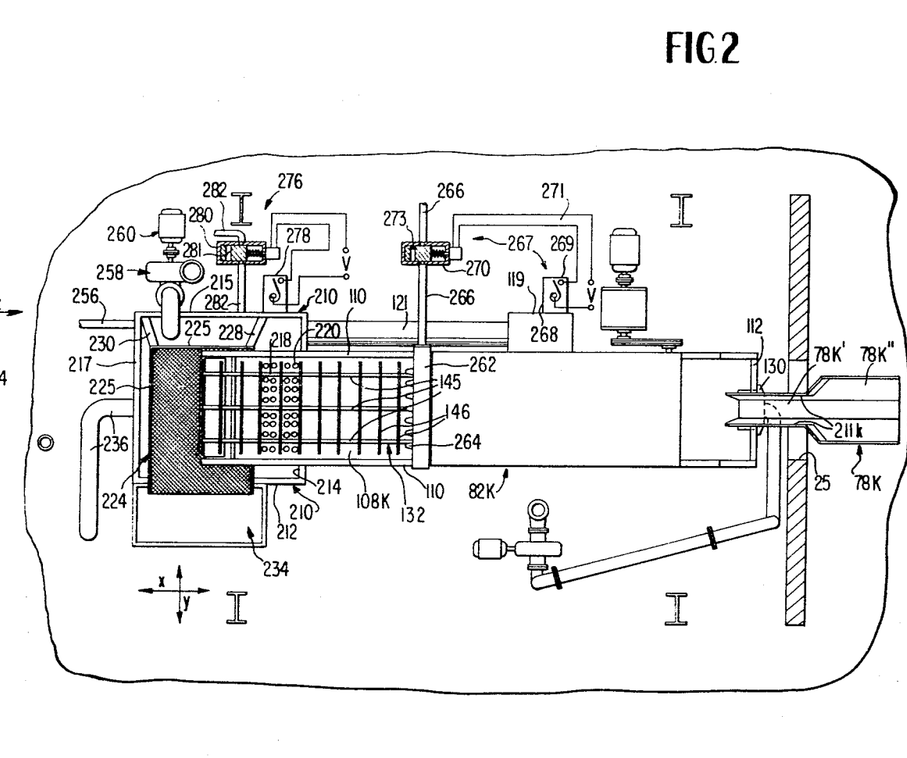
FIG. 2 is a top plan view of the steel slag granulator and related hydraulic slag transport apparatus shown in FIG. 1 (some parts in the upper part of FIG. 1 being omitted for clarity, and looking in the direction of arrow 2 in FIG. 1).

Referring especially to FIGS. 1 and 2, which show the system of this invention with an open hearth steel-making furnace for illustration, the molten steel slag 64 is discharged into an inclined trough-shaped front-flush slag runner or chute 78$k$, which extends through an aperture 25 in vertical wall 27 and is suspended so as to be movable to displace the end of chute 78$k$ from below the spillway 66 (as hereinafter amplified). The molten slag 64 spills from the lower end of the runner or chute 78$k$ into one end of a granulator generally indicated at 82$k$, which is located at yard level in the kitchen 26, and is more fully described below.

Referring especially to FIGS. 1 and 2, the slag granulator 82$k$ comprises a large rectangular tank which is somewhat boat-shaped as shown. The granulator 82$k$ includes a tank made up of a framework plus a horizontally disposed rectangular bottom plate 106, a sloping bottom rectangular plate 108$k$, a pair of like vertical plate sidewalls 110 having a configuration as shown in FIG. 1, and a rectangular end wall 112 (towards the furnace). The aforementioned components are welded, or otherwise suitably secured together to form a watertight tank of boatlike shape for granulator 82$k$ in a manner known in the art. [For a more detailed description of the granulator tank, see my aforementioned applications Ser. Nos. 126,792; 428,519; and 485,037.]

One tank sidewall 110 (the upper shown in FIG. 2) is provided with a rectangular cutout 114 of suitable size to provide a weir 116 for overflow of water in the tank, indicated at 117. The water flows from the tank of granulator 82$k$ into a rectangular-shaped water discharge box 119, from which it is in turn carried away through a discharge pipe 121. [For a more detailed description of these components of granulator 82$k$, see drawings and discussion of like-numbered components in my aforementioned applications Ser. No. 126,792, Ser. No. 428,519 and Ser. No. 485,037.] In this system, the pipeline 121 extends to an auxiliary tank 210 having a bottom 212 and four rectangular sidewalls 214, with an open top, for purposes hereafter amplified.

A suitable arrangement is provided at the end of the granulator 82$k$ to support the lower end of the slag feed chute 78$k$ which overhangs the tank end 112 of the granulator 81$k$ (as more fully discussed below). The end wall 112 of granulator 81$k$ is provided with a pair of rectangular apertures that receive the forward ends of nozzles 130, which are shown and described in detail in my earlier aforementioned applications; see FIGS. 8-20 of Ser. No. 126,792 and FIGS. 5-7 of Ser. No. 428,519 and Ser. No. 485,037 and related description incorporated by reference herein. Each of the nozzles 130 has a configuration which forms a rectangular passageway so that water is ejected from the nozzle 130 in a flat wide jetstream. Each nozzle 130 is mounted on the granulator 81$k$ by any suitable means (not shown for clearer illustration in the drawings), with the forward ends of the nozzle 130 extending through rectangular apertures in the tank end wall 112 of granulator 81$k$.

Water is fed through the nozzles 130 from supply conduits 131$k$ under substantial pressure by suitable commercially available means, e.g., pump 216, whereby the water is expelled from the rectangular openings of each of nozzles 130 in two flat jetstreams, one over the other. The hot slag which spills into the end of granulator 82$k$ from the chute 78$k$ intercepts these flat jetstreams of water from nozzles 130, thus causing the slag to be rapidly chilled and granulated into particles of solid metal, solid ferrous ore, nonferrous slag and gangue. This granulation of the molten steel slag is achieved by a combination of mechanical disruption and chilling of the molten steel slag discharged into granulator 82$k$ by the water jetstreams from nozzles 130, particularly the upper nozzle.

The granulator 82$k$ is provided with an endless rake-type flight conveyor generally indicated by the numeral 132. [Conveyor 132 is shown especially in FIGS. 5 and 6 of my aforementioned application Ser. No. 126,792 and in FIGS. 3 and 4 of my applications Ser. No. 428,519 and Ser. No. 485,037 and is fully described in the specifications thereof, which disclosure is incorporated herein by reference.] The conveyor 132 includes three endless link chains 145 extending over each of the three sets of aligned sprockets and rollers mounted on the upper ends of granulator tank sidewalls 110, with part of each chain 145 being suspended near the bottom plates 106 and 108$k$ of the granulator 82$k$, as illustrated in FIGS. 1 and 2. A series of rectangular steel slights 145 are secured to portions of three endless chains 145 by suitable means, thus providing a plurality of drag flights extending substantially across the width of the tank granulator 82$k$ at small spaced intervals.

The lower sections of the chain flight conveyor 132 are located near the tank bottom plates 106 and 108$k$ so that the flights 146 will rake the granulated slag and metal in granulator 82$k$ to the upper prow end of sloping bottom plate 108$k$, adjacent roller shaft 144, with edges of the flights 146 slightly clearing the bottom tank plate 106.

The flight chain conveyor 132 is driven in the direction indicated by the arrows in FIG. 1 by a suitable variable speed motor and drive illustrated at 150 (and more fully shown and described in my aforementioned applications Ser. No. 126,792, Ser. No. 428,519 and Ser. No. 485,037).

It will be noted that the slag can be discharged from the slag chute 78 into the granulator 82$k$ through the flights 146 of the rake conveyor 132, whereby continuous rake conveyor operation does not interfere with the feeding of the steel slag into granulator 82$k$, even during periods of maximum steel slag feed when the slag may be thrown forward from the end of chute 78 as it spills into granulator 82$k$.

To avoid having steam generated within the granulator tank 82$k$ pas pass off into the furnace building "kitchen" 26 in objectionable quantities, the granulator 82$k$ is preferably also provided with a suitable steel hood generally indicated at 180$k$ in FIGS. 1 and 2. [Illustrated steam hood 180$k$ is of like construction as hood 180$h$ shown and described in my aforementioned application Ser. No. 304,932 to which reference is made for further details.]

Referring back particularly to FIG. 1, the chute 78k for feeding granulator 82k is movable by hoist means generally indicated at 80k for installation of the system for an open hearth furnace, for reasons amplified in applications Ser. No. 126,792 and 428,519.

As shown particularly in FIG. 2, the slag chute 78k comprises an elongated runner and boot section 78k' and an enlarged head end 78k'' with a configuration as illustrated. The chute 78k is made of cast steel, with a radius on all angles to facilitate free flow of the slag in the chute which may also be lined with a suitable refractory material if desired. The upper end of chute 78k is provided with a pair of lugs 99k to which are attached a pair of cables or chains 87k, with the lower end of chute 78k being pivotally mounted on or adjacent granulator end wall 120 so that chute 78k may be pivoted upward to dotted line position illustrated in FIG. 1 and dropped to full line illustrated position by rotation of pulley 89k through any suitable known means (which per se is not a feature of this invention).

As will be apparent from FIGS. 1 and 2, in the illustrated open hearth furnace installation of this new system, the head end 78k of chute 78k extends through aperture 25 in the upper part of the vertical wall 27 which separates the kitchen 26 from the pit 68 below the furnace 20. Thus, when the slag chute 78k is in lowered position shown in solid line in FIG. 1, the steel slag 64 flushed from furnace 20 is discharged through the spillway 66 into the head end 78k'' of chute 78k, and then flows down chute 78k, which is at a suitable angle, i.e., about 35° from horizontal, and spills from the boot end 78k' into the granulator 81k where it is converted to granular particles of slag and metal, as previously explained. If, for some reason, it is desired not to use the slag granulator 82k, the head end 78k'' of the chute 78k is raised by rotation of pulley 89k, and cable 87k to the dotted line position in FIG. 1 whereby chute head end 78k'' is removed from the path of the molten slag by spilling through spillway 66, then the molten slag (or steel) 64 is promptly diverted from the granulator 82k to the ground for removal by current practices described above, when necessary or desirable; e.g., in the case of an open hearth furnace "reaction" or "break out" there would be sudden increase of load on the granulator 82 which could create a dangerous condition if the surge of molten slag (and/or steel) were not diverted.

Suitable hoist means such as diagrammatically indicated at 80k are commercially available, and arrangements for employing them in a system according to FIGS. 1 and 2 will be apparent to those skilled in the art in light of the disclosure herein and in my copending applications Ser. No. 126,792, Ser. No. 428,519 and Ser. No. 485,037.

A preferred embodiment for granulation of open hearth steel furnace front-flush slag according to the present invention using a preferred movable chute arrangement for transferring molten slag to a granulator (like 82k) in the kitchen 26 away from below the charging floor spillway 66 and promptly diverting the molten slag from the granulator to below the furnace, when desired, is disclosed in my aforesaid copending application Ser. No. 304,932 on "Steel Slag Handling System," which disclosure is incorporated herein by reference as though fully set forth herein. Hence, further detailed showing and discussion thereof is believed unnecessary, especially since the particular details of these chute displacement means are not per se a part of the present invention, and may in fact be omitted in using the present invention in granulation and hydraulic transport of BOF or OSM and electric steel slags.

Figure 3:
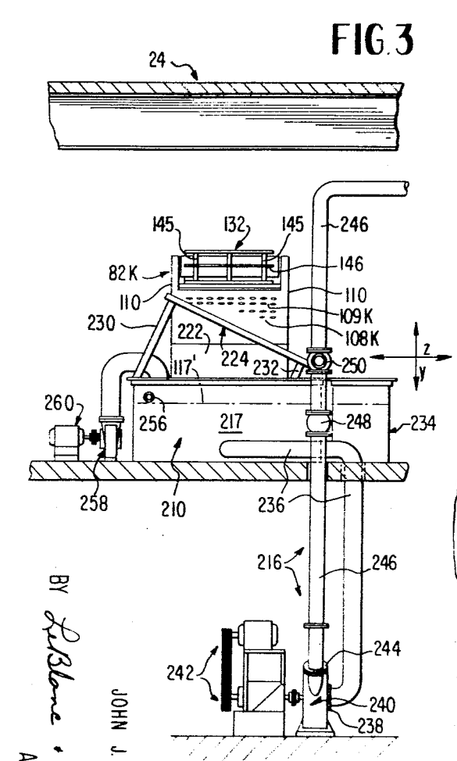
FIG. 3 is an end elevation view of the granulator and hydraulic slag transport means shown in FIGS. 1 and 2 (looking to the right per arrow 3 in FIG. 1)

For convenience, the granulation system of FIGS. 1-3 may be considered as having three mutually perpendicular reference axes, indicated at $x$, $y$ and $z$ in FIGS. 1-3. Thus, in the illustrated embodiment the length of granulator 82k extends in the direction of horizontal axis $x$ with sidewall and other components extending in the direction of vertical axis $y$, and with other components extending transversely to the granulator's longitudinal axis $x$ as indicated at $z$. Referring to FIGS. 5-7 of my aforementioned applications Ser. Nos. —b 428,519 and 458,037 and FIGS. 8-10 in Ser. No. 126,792, each water jet nozzle 130 is provided with a flat rectangular opening 135b so that a flat wide water jetstream is emitted horizontally from nozzle 130 in the direction of axis $x$ of granulator 82k.

By way of example, water ejection nozzles 130, shown in said Figures of my earlier applications, may have a rectangular jet aperture 135b of about 14 inches by three-eights inch in cross section, for a granulator 82k about 32⅓-feet long overall, with flat bottom 106 being about 20 feet long, about 5 feet high at the jet end and 7½-feet high at the prow end, and about 5½-feet wide; and the upper and lower nozzles 130 being respectively located about 1 foot and 1¾-feet from the upper edge of the tank end wall 112. It has been found that the width of the rectangular water jet aperture of each nozzle 130, in the direction of granulator's transverse axis $z$, should preferably exceed by at least 10 percent the width between the inside of the sidewalls 211k of the end portion 78k' of the slag chute 78k, when the centerline of end portion 78k' of the slag chute overlies the centerline of each water jet nozzle 130, as illustrated. If, however, the chute nozzles do not have their centerlines so aligned, then the width of said jet nozzle opening and the width of end portion 78k' of slag chute 78 between walls 211k at granulator 82k should be such that each slag chute sidewall 211k is located in transverse direction $z$ so that the adjacent sidewall of nozzle 130 forming the water jet aperture is disposed outside or beyond the respective chute wall 211k a distance equal to at least 5 percent of the chute width. Slag chute end 78k' should not extend any substantial extent in the direction of the transverse horizontal $z$ axis, to avoid feeding molten slag with any substantial trajectory in the direction of axis $z$ transverse to the water jetstream injected in direction of axis $x$; that is the slag chute 78k should extend in the direction of the longitudinal axis $x$ when slag is being poured into the granulator 82k. Also, it is found desirable to make the slag chute end portion 78k' feeding the granulator 82k with substantially parallel sidewalls 211k extending for a sufficient length in the direction of the longitudinal reference axis $x$ to assure a proper molten slag trajectory with reference to the water jetstreams from nozzles 130. (That is, it is preferable not to use a slag chute whose end portions adjacent granulator end wall 112 have nonparallel sidewalls extending in the direction of transverse reference axis $z$.) However, the jet nozzles 130 may be tilted slightly up or down in the direction of vertical reference axis $y$, so as to be at a slight angle to horizontal reference axis $x$.

Water is fed to nozzles 130, via conduits 131k, at sufficient pressure, e.g., 35-60 p.s.i., and in sufficient amount, to produce substantially instantaneous solidification and granulation of the slag into metal and nonmetal particles of sizes usually running less than one-half inch in dimension, as hereafter amplified.

Water or a liquid of comparable characteristics must be used as the liquid for the jet stream and cooling medium to granulate molten steel slag in granulator 82k according to the system herein disclosed. However, because of its availability in large quantity at low cost, water is the only presently known liquid which is commercially usable for the steel slag granulation system of this invention. [The term "water," however, contemplates aqueous solutions with additives such as to change boiling point temperature or vaporization of the cooling medium, or the like.]

Referring now particularly to the hydraulic granulated slag slurry transporting arrangement generally indicated at 216 in FIGS. 1 and 2, the sloping bottom plate 108k of granulator 82k is modified to incorporate a section 218 having a plurality of apertures 220 which have a preselected maximum dimension of between ¼ inch to 2 inches. Instead of a perforated plate section 218, it is possible to substitute at 218 a grating having a preselected maximum aperture dimension of ¼ inch to 2 inches. The perforated or grating section 218 overlies the auxiliary tank 210 so that minus ¼ inch to 2 inches granulated slag (and metal) particles and water moved up the sloping bottom plate 108k of granulator 82k by flights 146 of rake conveyor 132 fall into the auxiliary tank 210 through apertures 220. Referring particularly to FIGS. 1 and 3, a plate 222 may be provided extending from the underside of the granulator's sloping bottom wall 108k to the wall 214 of auxiliary tank 210 to guide water and slag slurry from apertures 220 into tank 210.

As illustrated particularly in FIGS. 2 and 3, a slanted screen generally indicated at 224 is mounted below the sloping bottom wall 108k of granulator 82k beyond the perforated bottom section 218 (i.e., to the left of perforated section 218 as shown in FIG. 1), and above the auxiliary tank 210. The sloping screen 224 extends sufficiently beyond the "prow end" of granulator 82k and rake conveyor pulley 144, as illustrated particularly in FIGS. 1 and 2, so that granulated slag (and water) discharged from the "prow end" of the granulator 82k will fall onto screen 224. Screen 224 is provided with mesh, grating or screen having a maximum aperture size which limits the size of solids falling into the auxiliary tank 210 to a preselected dimension, and thereby prevents oversize solids from entering the hydraulic granulated slag slurry transport system 216; e.g., in a suitable embodiment the screen 224 may have a mesh or aperture size of plus 2 inches. Screen 224 is mounted below granulator bottom sloping wall 108k and above auxiliary tank 210 by any suitable means, in a manner which will be apparent to those skilled in the art from the disclosure herein; e.g., the screen 224 may be mounted by means of an angle 226 or the like secured to the underside of the bottom granulator sloping wall 108k plus a plurality of posts 228, 230 and 232 extending between the frame 225 of screen 224 and the side walls 212, 214, 215, and 217 of auxiliary tank 210. As shown particularly in FIGS. 2 and 3, the lower end of slanted screen 224 extends over the sidewall 212 of auxiliary tank 210 and the adjacently disposed sidewall of a movable "tote box" 234. Thus, solids in excess of the mesh size of screen 224 e.g., over 2 inches) discharged from the "prow end" of the granulator 82k fall by gravity down screen 224 into the tote box 234, whereas slurry containing solids less than the mesh size of screen 224 will fall into the auxiliary tank 210 for subsequent removal by the hydraulic granulated slag slurry transport system indicated generally at 216. The tote box 234 is removed for emptying, and replaced, as necessitated by accumulated oversize solids.

If desired, a suitable commercially available vibrator device may be provided for agitating 224, in a manner which will be apparent to those skilled in the art in the light of the disclosure herein. Such a screen vibrator device increases the assurance of transfer of oversize solids from the screen 224 to the tote box 234. However, a vibrator is unnecessary in many instances, since the force of gravity is adequate to cause most of the oversize solids to roll down screen 224 into the tote box 234, and the operator may check an clear the screen after completion of a slag run.

It is noted that use of apertured or grating section 218 in the bottom of granulator wall 107k is preferable because it removes a large proportion of the granulated slag and water slurry and minimizes excessive "throwing" of slurry from the prow end of the granulator by rake conveyor flights 146.

Referring especially to the hydraulic slag slurry transport means indicated generally at 216, a pipe 236 is connected to the lowermost portion of one of sidewalls 217 of auxiliary tank 210 and to the input 238 of a suitable commercially available centrifugal pump 240 which is driven by a suitable power source, such as an electric motor speed control device shown at 242 (see particularly FIGS. 1 and 3). The output 244 of pump 240 is connected to a discharge line 246, which preferably is provided (in an accessible region near the granulator 82k) with a suitable commercially available check valve 248 and shutoff valve 250. The discharge conduit 246 is suspended from parts of the furnace building by suitable means such as hangers indicated schematically at 252, and extends outside the furnace building to a suitable disposal point at a distance from the building e.g., 1,700 feet (such pumping extension not shown in detail as that would be apparent to those skilled in the art in the light of the disclosure herein). In some installations the lower outlet end 247 of the discharge pipe 246 may be disposed below the level of the pump 240 to create a siphon effect, thereby decreasing the power requirements of the drive motor 242 of pump 240, however, this is not essential, and in fact involves a countereconomic factor because siphoning requires that the sections making up discharge pipe 246 and related couplings be airtight, which is not required if such siphon effect is not sought.

Referring particularly to FIGS. 1–3 in the illustrated embodiment, centrifugal pump 240 is disposed a distance equal to one floor level below the yard or floor level on which granulator 82k and auxiliary tank 210 are disposed. This is desirable to provide a suction head for inlet 238 of pump 240, which preferably should be about 10 feet of head to minimize inefficiency, sealing or related problems in operation of centrifugal pump 240 when the granulated slag slurry fed through pump input 238 via conduit 236 from granulator 82k and auxiliary tank 210 approaches or reaches boiling temperature of 212°, as when granulator 82k is loaded at a high rate of tons of slag (and metal) per minute, as amplified below. However, the slag slurry system 216 may be operated with the pump 240 disposed at the same yard or floor level as granulator 82k and auxiliary tank 210, e.g., at the location indicated at 241 in FIG. 1. Some steel furnace plants are so constructed without a sub-basement as shown in FIGS. 1 and 3, so that it may not be possible to lower the pump 240 with respect to auxiliary tank 210 to such extent. However, it is desirable to produce such input head as is feasible between the outlet of tank 210 and inlet 238 of pump 240, as by putting pump 240 in a small well or by raising the granulator 82k and auxiliary tank 210 on a platform (the latter may be desirable with some steel furnaces for other reasons, such as a shorter slag chute 78k feeding granulator 82k to minimize viscosity problems for certain types of steel slags).

Referring back particularly to FIGS. 1 and 3, the cutout 114 in the sidewall 110 (upper in FIG. 3) and the weir edge 116 determine the water level 117 in granulator 81k and thus the level of water in the weir outlet box 119, as described earlier (and as shown and explained in greater detail in my aforementioned applications Ser. No. 126,792, Ser. No. 428,519, Ser. No. 485,037, and Ser. No. 304,932). This normally establishes a like water level indicated at 117' within auxiliary tank 210, to which water is transferred from granulator 82k via weir box 119 conduit 121. When the pump 240 is operating to remove the granulated slag (and metal) water slurry from auxiliary tank 210, it may cause water level 117' within auxiliary tank 210 to fall, as when the pumping rate of pump 240 exceeds the volumetric rate of input and output of water alone or with slag in granulator 82k and tank 210. Accordingly, auxiliary tank 210 is provided with a suitable commercially available float or other flow control device generally indicated at 254, plus related piping and water source. Such flow control device 254 contains a valve operated in response to the change in water level 117' within auxiliary tank 210 cause addition of water to auxiliary tank 210, whereafter flow control device 254 cuts off further supply of water to tank 210 when the water level 117' within auxiliary tank 210 is at a proper level within preestablished tolerances. Since the particular float or other flow control device 254 is not per se a part of this invention, and various suitable commercial types are available and may be used in a manner apparent to those skilled in the art in light of the disclosure herein, further description of flow control 254 is deemed unnecessary.

A runoff pipe 256 is preferably provided slightly below the top of the auxiliary tank communicating with an aperture in tank wall 217, whereby if excessive water or granulated slag slurry if fed into auxiliary tank 210, water overflows through runoff pipe 256 which is connected to an existing sewer or other water disposal means. The heavier granulated slag and metal particles settle by gravity within auxiliary tank 210 fairly rapidly so that the runoff through overflow pipe 256 is water without substantial solids.

Referring particularly to FIGS. 2 and 3, in some furnace installations the sewer level or other waste water discharge arrangements may be of higher elevation than granulator 82k and auxiliary tank 210 whereby it is desirable to provide an additional smaller centrifugal pump 258 driven by suitable means such as motor 260. This second pump 258 may be turned on manually, or by suitable automatic means, to discharge excessive water from auxiliary tank 210 either in conjunction with runoff pipe 256, or without it (as where the sewage disposal point is above the tank so that overflow runoff pipe 256 cannot be used. It is noted that when the lower end 247 of discharge conduit 246 is extended to a level below hydraulic pump 240 for utilizing the above-discussed siphon effect to minimize power requirements for pump motor 242, it is necessary to take into account possible backflow of the volume of water or granulated slag slurry contained within that part of the elongated discharge conduit 246 which is above the level of the auxiliary tank 210 when the siphon is broken; thus a suitable runoff pipe arrangement 256 and/or auxiliary pump 258 to handle backflow through discharge conduit 246, pump 238, and input conduit 236 to tank 210, in addition to check valve 248 and shutoff valve 250 may be desirable.

Referring back especially to FIG. 2, the granulator 82k is also preferably provided with a manifold 262 having a series of spray heads 264 and supplied with water from a conduit 266 connected to a suitable source. Preferably, flow of water through 266, 262, 264 is governed by a thermostat control arrangement generally indicated at 267. This includes a thermostat switch device 268 of suitable commercially available type inserted into weir box 119 below the level of weir 116, with thermostat switch 268 operating a suitable commercially available spring biased solenoid control valve such as schematically shown at 270 in water supply conduit 266. The arrangement is set so that when the thermostat element of thermostat switch 268 is affected by a granulated slurry temperature in granulator 82k and weir box 119 approaching a predetermined differential from boiling, 212° F., e.g., 185° F., the switch portion 269 will close so that current in circuit 271 from source V will energize and cause normally closed solenoid operated valve 270 to open. This permits flow of water through valve opening 273 and conduit 266 into manifold 262 from which it is sprayed into granulator 82k through nozzles 264, thereby cutting the temperature of the granulated slag slurry water bath in granulator 82k. While water may be added to granulator 82k by analogous thermostatically controlled means using one or more pipes in lieu of spray nozzles 264, the use of spray nozzles has the advantage, in some instances, of more effectively depressing steam over granulator 82k, which is desirable from an operating viewpoint.

In addition, a similar thermostatic control arrangement is preferably provided for auxiliary tank 210, as generally illustrated at 276 in FIG. 2 This includes a thermostat switch 278 inserted through sidewall 215 of auxiliary tank 210 at an appropriate point, below the normal range of water level 117' as controlled by flow device 254; and thermostat switch 272 controls a suitable commercially available solenoid operated valve schematically shown at 280 in a water input conduit 282 connected to the interior of tank 210 through an aperture in tank wall 215. Thus, thermostat switch 278 may be set so that when the water and slag slurry in tank 210 is within a predetermined temperature range of boiling, 212° F., e.g., 185° F., it will energize and cause normally closed solenoid valves 280 to operate displacing valve opening 281 in water line with conduit 282 so that water is fed into the auxiliary tank 210 from a suitable source to lower the temperature of the water in auxiliary tank 210.

Use of one, and preferably both of the thermostatic control systems 267 and 276 makes it possible to maintain the temperature of water and slag slurry fed from auxiliary tank 210 to centrifugal pump 240 through conduit 236 at a temperature sufficiently below boiling 212° F. to maximize efficient operation of the centrifugal pump 240 (in balance with other aspects of the system as herein discussed).

From operation of a steel-slag granulation system such as disclosed herein, it has been found that the steel-slag granulation system according to this invention should preferably be operated according to the following conditions:

1. Water should be supplied to appropriately sized granulator nozzle(s) 130 via associated water conduit(s) 131k in such quantity that the flat jetstream of water is injected into granulator 82k from nozzle(s) 130 at a jet velocity in feet per second (f.p.s.) and in gallons per minute (g.p.m.) varying in relation to the rate at which molten steel furnace slag is poured into granulator 82k to intercept the water jetstream(s), as follows: (a) For a molten slag input rate of up to about 2 tons per minute, at least one flat water jetstream at a jet velocity of at least about 25.0 f.p.s., and at least about 400 g.p.m., (b) For a molten slag input rate of 2 tons to about 4 tons per minute, at least one flat water jetstream at a jet velocity of at least about 30 to 36.5 f.p.s., and at least about 500–600 g.p.m. (c) For a molten slag input rate of 4 to about 7 tons per minute, inject at least about 1,200'–1,800 g.p.m., either by two flat water jetstreams through two nozzles, one over the other, each water stream having a jet velocity of at least about —b 36.5 to 55 f.p.s.; or through one flat water jetstream via one nozzle with a jet velocity of at least about 73 to 110 f.p.s. (d) For a molten slag input rate of over 7 tons per minute, e.g., 7–8, inject at least 1,800–2,000 g.p.m., either by two flat water jetstreams through two nozzles, one over the other, each water stream having a jet velocity of at least 55 to 61 f.p.s., or through one flat water jetstream via one nozzle with a jet velocity of at least about 110 to 122 f.p.s.

2. Water should be introduced to granulator 82k at a quantitative rate in gallons per minute varying in relation to the rate at which molten steel furnace slag is poured into the granulator 82k as follows: (a) Water should be introduced into granulator 82k at the slag input end (adjacent wall 112) at an average rate of at least about 400 g.p.m., per ton of steel slag per minute poured into the granulator. (b) However, water should preferably be introduced at the slag input end of the granulator 82k at an average rate of about 900–1,350 g.p.m., per ton of steel slag per minute poured into the granulator. (c) And, it is best to use at least about 1,350–1,600 g.p.m., per ton of steel slag per minute poured into the granulator to avoid objectionable vaporization and formulation of steam. The input water preferably should be a typical water main temperature (e.g., 60° F. to 70° F.); however, furnace-cooling water or other plant-used water may be employed, but its temperature preferably should not exceed 100° F.

3. It is preferable that the amount of water per paragraph 2 be introduced into granulator 82k by means of the jet nozzles 130 in such quantitative g.p.m., rates according to varying molten steel slag tonnage input rates. However, with the suggested embodiment, size of jet nozzles 130 is such that the desired water jet velocities and g.p.m., per parts (a), (b), (c) and (d) of paragraph 1 above frequently can be achieved with a lower quantity of water through the nozzle(s) 130 than required to meet the conditions of part (a), (b) or (c) of paragraph 2. In such event, it is possible to introduce the requisite water per paragraph 1 through the jet nozzle(s) 130 to achieve at least the water jet velocities and g.p.m., set forth in paragraph 1 above, and to introduce the remainder of the water per paragraph 2 by other means; e.g., a water pipe of suitable size may be secured to end wall 112 of granulator 82k below the lowest nozzle 130, at point 220 or 222 in FIG. 1, to supply additional water to granulator 82k by conduit from a suitable source. However, the safest and best approach is to introduce all water requirements per paragraph 2 into granulator 82k through the water jet nozzle(s) 130. This increases the effectiveness of the water jets for breaking down the molten steel slag into small particles to achieve more rapid and more efficient slag cooling and granulation, and helps control resultant granulated slag particles for better magnetic separation and also efficient hydraulic slurry transportation as amplified below.

4. In light of the foregoing, good results can be achieved by operating the granulator system of this invention using two flat jetstreams of water injected horizontally into granulator 82k through two likesize nozzles 130, one over the other, according to the following: (a) For molten slag input of up to about 2 tons per minute, inject two water streams with jet velocity of about 36.5 to 61 f.p.s., and about 1,200–2,000 g.p.m., through both jets. (b) For a molten slag input rate of 2 to about 4 tons per minute, inject two water jetstreams at a velocity of at least 61 to ⅔f.p.s., and about 2,000–4,000 g.p.m., through both jets. (c) For (slag input rate of 4 to about 7 tons per minute, inject two water jet streams at a velocity of at least about 91 to 146 f.p.s., and about 3,000–5,000 g.p.m., through both nozzles.

5. Granulation of the molten steel slag is generally largely accomplished by the flat water jet stream from the upper nozzle 130, with the lower water jet stream from lower nozzle 130 supplementing the upper jet stream and also providing a safeguard against malfunction of the upper water jet while molten steel slag is being poured. Thus, more effective granulation of the molten steel slag may be achieved by injecting 3/5 to ¾ (60–75 percent), and preferably ⅔ (66.6 percent), of available water through the upper of two likesize nozzles 130 (14 inches × ⅜ inches opening, one over the other, aligned), and injecting the balance of the water through the lower nozzle. Thus, in light of the foregoing, good results can be achieved according to the following: (a) For a molten slag input rate of up to about 2 tons per minute and using water available at about 1,200–2,000 g.p.m., inject about 800–1,350 g.p.m. (⅔) through the upper nozzle 130 at about 49 to 82 f.p.s., and about 400–640 g.p.m. (⅓) through the lower nozzle 130 at about 25 to 39.5 f.p.s. (b) For a molten slag input rate of 2 to about 4 tons per minute and using water available at about 2,000–4,000 g.p.m., inject about 1,350–2,700 g.p.m. (⅔) through the upper nozzle 130 at about 82 to 164 f.p.s., and about 650–1,300 g.p.m. (⅓) through the lower nozzle at about 39.5 to 79 f.p.s. (c) For a molten slag input rate of 4 to about 7 tons per minute and using water available at 3,000–5,000 g.p.m., inject about 2,000–3,350 g.p.m. (⅔) through the upper nozzle 130 at about 122 to 202 f.p.s., and about 1,000–1,650 g.p.m. (⅓) through the lower nozzle at a velocity of at least about 61 to 101 f.p.s.

Operation of granulator 82k per the foregoing, especially per the conditions of paragraphs 4 and 5, provides resultant granulated steel slag of desirable particle size for efficient magnetic separation of ferrous material, and efficient hydraulic transportation per discussion below.

The water may be supplied to one or both nozzles 130 through each of conduits 131k by conventional pump means at suitable pressure and in suitable quantity to achieve the desired nozzle jetstream velocity and g.p.m., input per paragraph 1 above, the desired g.p.m., water input per paragraph 2 above, or the preferred jet velocities and g.p.m., per paragraph 4 or paragraph 5 above, according to varying rate of steel slag feed to the granulator with different size steel furnaces, in a manner which will be apparent to those skilled in the art in light of the disclosure herein and using known scientific and engineering information.

By way of example, referring to operating conditions per paragraph 4 above, with like nozzles 130 of granulator 82 having a rectangular jet aperture 135b or about 14 inches by ⅜ inch in cross section, and a 4½-inch ID section at 143b connected to conduit 131, water supplied at 35 p.s.i., to each nozzle 130 may be injected into the granulator 82 at about 68 f.p.s., and about 1,100 g.p.m., from each nozzle, and thus 2,200 g.p.m., from both, according to the suggested operating conditions of paragraph 4 above. As another example, if granulator 82 has larger nozzles 130 having a rectangular aperture 130b of 22 inches by ⅜ inch in cross section (e.g., for use with a slag chute 78k having a width of 20 inches) with a 4½-inch ID section at 143b connected to conduit 131, water supplied at 35 p.s.i., may be injected into the granulator 82 at about 75.5 f.p.s., and about 1,950 g.p.m., from each nozzle, and thus 3,900 g.p.m., from both, according to suggested operating conditions of paragraph 4 above.

Referring to paragraph numbered 5 above, the thickness of one or both nozzles 130 may be modified to analogously use more than half of available water in the jetstream from the upper nozzle and less than half in the lower jetstream. Thus, the opening 132b of upper nozzle 130 may have a thickness (in direction of axis y greater than the thickness of opening 132b of lower nozzle 130, both the upper and lower nozzles having an opening 132b with like width in direction of reference axis z. For example, the upper nozzle 130 may have an opening 132b of 14 inches by 9/16 inch while the lower nozzle 132b has an opening of 14 inches by ⅜ inch. Thus, by way of example, for a molten slag input of up to 2 tons per minute and using 2,000 g.p.m., available water, 1,200 g.p.m., (60 percent) would be injected through the top nozzle at 49 f.p.s., and 800 g.p.m., (40 percent) through the lower nozzle at 49 f.p.s.

Referring again more particularly to the hydraulic granulated slag slurry transport arrangement generally indicated at 216, this system 216 must be constructed and operated in correlation with the granulation of steel slag in granulator 82k. For one thing, the average rate of output of water and granulated slag slurry from granulator 81k must substantially equal the average rate of input into granulator 82k of water via jets 130 (and otherwise) plus slag, subject to variations of water input into auxiliary tank 210 per flow control 254, overflow of excess water via runoff pipe 256, etc. as discussed above.

It has been found that the minimum velocity in discharge conduit 246 for granulated steel slag discharged from granulator 82k is about 17 feet per second. It has also been found that up to about 17 percent solids to water is a suitable granulated slag to water ratio for slurry transported through the system subject to 50 percent surge increase, and the pump 240 should be able to accommodate same. It has also been found preferable to control the temperature of the granulated slag slurry auxiliary tank 210 so that it is fed to the inlet 238 of pump 240 via intake conduit 236 at a maximum temperature of about 180° F., but, this temperature may be increased to boiling especially if the input pressure head on pump input 238 is increased, as by a static head in conduit 236 of 10 to 18 foot.

In typical steel slag granulation with operation of granulator 82k according to the foregoing discussed conditions, most of the particle sizes are below 65 mesh, with a small percentage of +65 mesh to minus ¼ inch, and some +¼ inch to −2 inches. This is well handled by the hydraulic slag system 216 as discussed herein.

By way of example, a satisfactory installation of a hydraulic granulated slag transport system 216 in conjunction with granulator 82k may be operated as described herein with good results using a commercially available 3,500 g.p.m., 10-inch "Aamsco-Nagle" or "Morris Dredge" centrifugal pump capable of handling particles of +2 inches to −4 inches in size, and up to 3,100 gallons of water per minute plus up to 4 tons of slag per minute, using 12-inch diameter input pipe 236 and a 10inch diameter discharge pipe 246, 1,700 feet in length. The system described may be operated with an input of 1,800 g.p.m., of water through both nozzles 130 providing two horizontal jetstreams having a jet velocity of 55 f.p.s., at a slag tonnage input rate varying up to 4 tons per minute, and generally averaging 1 to 2 tons per minute. In addition to the 1,800 g.p.m., of water introduced into granulator 82k through nozzles 130, makeup water is also introduced at the rate of 800 to 1,350 gallons to auxiliary tank 210 so as not to "starve" the input to pump 240. The pump is driven by suitable variable drive 242 to provide some adjustment for varying g.p.m., water rate and slag content in accordance with operation of the granulator 82k at varying water and slag input rates.

As will be apparent, the velocity of the water and granulated slag slurry in the discharge pipe 246 will vary according to such factors as (a) variation in diameter of discharge pipe 246, and/or (b) variation in volumetric rate of water and/or slag slurry through the system, and/or (c) variation in head on pump 240, e.g., due to difference in elevation between different points of the discharge pipe, and/or (d) pressure losses due to length of discharge pipe 246. Accordingly, as will be apparent to those skilled in the art in light of the disclosure herein, the hydraulic transportation system 216 and its components must be constructed and operated in correlation with operation of slag granulator 82k consistent with the above-discussed parameters for both slag granulator 82k and hydraulic slag slurry transport system 216.

It is noted that in operating granulator 82k and hydraulic system 216, the level 117 of the water and slag accumulating in the tank of granulator 82k is maintained below the lowermost water jetstream from either or both of nozzles 130 so that molten slag intercepts at least the upper jetstream above the water level 117 in granulator 82k. It is also noted the rake conveyor 132 agitates the bath and slag in granulator 82k, displaces slag away from nozzles 130 to prevent buildup in the region of the nozzles and provides other advantageous functions as amplified in my aforementioned earlier applications.

It will be apparent from the foregoing that the present invention provides a new improved steel slag granulation and handling and hydraulic transport system which departs from the materials-handling concepts of the above-discussed current and earlier slag removal systems, thereby avoiding their serious shortcomings and achieving other important objects and advantages as discussed earlier in this application.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of handling molten steel slag from a steel making furnace comprising the steps of pouring molten steel slag into a receptacle; injecting at least one jet of water into said receptacle to intercept said molten steel slag and to granulate said slag into particles; said water jet having a horizontal extent which is substantially large in comparison to its vertical extent, said water jet being injected into said receptacle at a rate of at least about 400 g.p.m., per ton of molten slag input per minute, and with a jet velocity ranging from at least about 25 f.p.s., for a slag input rate of up to 2 tons per minute to at least about 55–61 f.p.s. for a slag input rate of up to about 8 tons per minute; maintaining the water accumulating in said receptacle at a level below said water jet at all times while molten steel slag is being poured into said receptacle so that the molten slag intercepts said water jet above the water accumulated in said receptacle; discharging resultant granulated slag particles from said receptacle while granulation of the molten slag is in progress, at a rate sufficiently approximating the rate at which molten slag is poured into said receptacle so as to prevent substantial buildup of granulated slag particles therein; and transporting the granulated slag particles away from said receptacle by pumping the same through a conduit in the form of a water/slag slurry.

2. A method of handling molten steel slag as defined in claim 1 wherein said water/slag slurry is pumped through said conduit at a minimum velocity of about 17 feet per second.

3. A method of handling molten steel slag as defined in claim 1 further including the step of maintaining said slag/water slurry at up to about 17 percent granulated slag to water ratio for said slurry subject to about a 50 percent surge increase during transportation through said conduit.

4. A method of handling molten steel slag as defined in claim 1 further including transferring said granulated slag particles removed from said receptacle into an auxiliary receptacle; and wherein the step of transporting said granulated slag particles comprises pumping said granulated slag particles out of said auxiliary receptacle into said conduit.

5. A method of handling molten steel slag as defined in claim 1 further including the step of controlling the temperature of the granulated slag slurry being pumped into said conduit at a maximum temperature of about 180° F. to 212° F.

6. A method of handling molten steel slag comprising pouring molten steel slag into a receptacle; injecting at least one jetstream of water into said receptacle to intercept said molten steel slag and to granulate the molten slag into particles; the water stream being injected with a jet velocity of at least about 25.0 f.p.s., and at least about 400 g.p.m., for a molten slag input rate of up to about 2 tons per minute, the water stream being injected with a jet velocity of at least about 30 to 36.5 f.p.s., and at least about 500 to 600 g.p.m., for a molten slag input rate of 2 to about 4 tons per minute, the water stream being injected with a jet velocity of at least about 36.5 to 55 f.p.s., and at least about 1,200 to 1,800 g.p.m., for a slag input rate of 4 to about 7 tons per minute, and the water stream being injected with a jet velocity of at least about 55 to 61 f.p.s., and at least about 1,800 to 2,000 g.p.m., for a slag input rate of 7–8 tons per minute; maintaining water accumulating in said receptacle at a level below said jetstream while said molten steel slag is being poured into the receptacle so that the molten steel slag intercepts said jetstream above said accumulated water; removing resultant granulated slag particles from said receptacle while the granulation of the molten steel slag is in progress; and transporting the granulated slag particles away from said receptacle by pumping the same through a conduit in the form of a water/slag slurry.

7. A method of handling molten steel slag as defined in claim 6 wherein said slag/water slurry is pumped into said conduit at a maximum temperature of about 180° F. to 212° F., with a slurry velocity of at least 17 f.p.s., and with a slag to water ratio of less than approximately 17 percent, subject to about a 50 percent surge increase.

8. An apparatus for handling molten steel slag comprising: a slag granulator including a receptacle; means for feeding molten steel slag into the receptacle; means for injecting at least one jet stream of water into said receptacle so as to intercept said molten steel slag to granulate the molten slag into particles, said injecting means providing said water stream at a rate of at least about 400 g.p.m., per ton of molten slag input per minute, and with a jet velocity of at least about 25 f.p.s., for a molten slag input rate of up to 2 tons per minute, to at least about 55–61 f.p.s., for a slag input rate of up to about 8 tons per minute; means for maintaining water accumulating in said receptacle at a level below said jetstream while said molten steel slag is being poured into the receptacle so that the molten steel slag intercepts said jetstream above water accumulated in the receptacle; means for removing the granulated slag from said receptacle while the granulation of the molten steel slag is in progress comprising hydraulic granulated slag slurry transfer means including an auxiliary tank for receiving said granulated slag, pump means coupled to said auxiliary tank, and discharge conduit means connected to said pump means for transporting said slag to a remote location in the form of a granulated slag/water slurry.

9. An apparatus for handling molten slag comprising: a slag granulator including a receptacle; means for feeding molten slag into the receptacle; means for injecting at least one jetstream of water into said receptacle to intercept said molten slag and to granulate said slag into particles, means for maintaining water accumulating in said receptacle at a level below said jetstream while said molten slag is being poured into the receptacle so that the molten slag intercepts said jetstream above water accumulated in the receptacle; means for removing the granulated slag from said receptacle while granulation is in progress comprising hydraulic granulated slag-slurry transfer means including discharge conduit means, and pump means connected to said discharge conduit means for propelling said slag through said conduit in the form of a granulated slag/water slurry.

10. Apparatus as defined in claim 9 wherein said slag-slurry transfer means includes an auxiliary tank for receiving granulated slag, and means connecting said pump means to said auxiliary tank for removal of said slag from said tank and transportation through said conduit means.

11. An apparatus as defined in claim 9 wherein said slurry transfer means removes said water and granulated slag slurry from said granulator means at substantially the average rate of input into said granulator means of water plus slag, and wherein said slurry transfer means includes means for varying the water content of said slurry to maintain said slurry velocity of at least about 17 feet per second in said discharge conduit.

12. An apparatus as defined in claim 11, wherein said slag transfer means includes means for varying the water content of said slurry to maintain up to about 17 percent granulated slag to water ratio for said slurry subject to 50 percent surge increase thereof at said slurry velocity.

13. An apparatus as defined in claim 9 further comprising means for controlling the temperature of the granulated slag slurry fed to the inlet of said pump means to maintain said slurry at a maximum temperature of less than about 180° F. to −212° F.

14. An apparatus for handling molten steel slag comprising: a slag granulator including a receptacle; means for feeding molten steel slag into the receptacle; means for injecting at least one jetstream of water into said receptacle so as to intercept said molten steel slag to granulate the molten slag into particles, said injecting means providing said water stream at a rate of at least about 400 g.p.m., per ton of molten slag input per minute, and with a jet velocity of at least about 25 f.p.s., for a molten slag input rate of up to 2 tons per minute, to at least about 55–61 f.p.s. for a slag input rate of up to about 8 tons per minute; means for maintaining water accumulating in said receptacle at a level below said jetstream while said molten steel slag is being poured into the receptacle so that the molten steel slag intercepts said jetstream above water accumulated in the receptacle; means for removing the granulated slag from said receptacle while the granulation of the molten steel slag is in progress comprising hydraulic granulated slag slurry transfer means for transporting said slag away from said granulator in the form of a granulated slag/water slurry.

15. Apparatus for handling molten steel slag comprising: a slag granulator and hydraulic transfer means as defined in claim 13 wherein said injecting means provides said water jet-stream at a jet velocity of at least about 25.0 f.p.s., and at least about 400 g.p.m., for a molten steel slag input rate of up to about 2 tons per minute, with a jet velocity of at least about −b 30 to 36.5 f.p.s., and at least about 500 to 600 g.p.m., for a molten steel slag input rate of 2 to about 4 —tons per minute, with a jet velocity of at least about 36.5 to 55 f.p.s., and at least about 1,200 to 1,800 g.p.m., for a molten steel slag input rate of 4 to about 7 tons per minute, and with a jet velocity of at least about 55 to 61 f.p.s., and at least about 1,800 to 2,000 g.p.m., for a molten steel slag input rate of 7–8 tons per minute.

16. Apparatus as defined in claim 9 wherein said injecting means comprises jet nozzle means extending horizontally a distance which is large compared to the vertical extent thereof.

17. An apparatus for handling molten steel slag comprising: a slag granulator and hydraulic transfer means as defined in claim 9, wherein said injecting means provides said water jet-stream at a rate of at least about 400 g.p.m., per ton of molten steel slag input per minute, and with a jet velocity of at least about 25 f.p.s., for a molten steel slag input rate of up to 2 tons per minute, to at least about 55–61 f.p.s., for a molten steel slag input rate of up to about 8 —l tons per minute.

18. An apparatus as defined in claim 10 further comprising means for preventing particles exceeding a predetermined size from entering said auxiliary tank.

19. An apparatus for handling molten slag comprising: a slag granulator including a receptacle; means for feeding molten slag into the receptacle; means for injecting at least one jetstream of water into said receptacle to intercept said molten slag to granulate the molten slag into particles, an auxiliary tank coupled to said granulator receptacle; means for maintaining water accumulating in said receptacle at a level below said jetstream while said molten slag intercepts said jetstream above water accumulated in the receptacle; means for transferring said granulated slag and water to said auxiliary tank; and hydraulic transport means for transporting the granulated slag away from auxiliary tank while granulation is in progress in the form of a granulated slag/water slurry.

20. An apparatus as defined in claim 19 further comprising means for preventing particles exceeding a predetermined size from passing into said slag transfer means.

21. An apparatus for handling molten steel slag comprising: a slag granulator and hydraulic transfer means as defined in claim 13, wherein said injecting means provides said water jet-stream at a rate of at least about 400 g.p.m., per ton of molten steel slag input per minute, and with a jet velocity of at least about −25 f.p.s., for a molten steel slag input rate of up to 2 tons per minute, to at least about 55–61 f.p.s., for a molten steel slag input rate of up to about 8 tons per minute.

22. Apparatus for handling molten steel slag comprising: a slag granulator and hydraulic transfer means as defined in claim 14 wherein said injecting means provides said water jet-stream at a jet velocity of at least about 25.0 f.p.s., and at least about 400 g.p.m., for a molten steel slag input rate of up to about 2 tons per minute, with a jet velocity of at least about 30 to 36.5 f.p.s., and at least about 500 to 600 g.p.m., for a molten steel slag input rate of 2 to about 4 tons per minute, with a jet velocity of at least about 36.5 to 55 f.p.s., and at least about 1,200 to 1,800 g.p.m., for a molten steel slag input rate of 4 to about 7 tons per minute, and with a jet velocity of at least about 55 to 61 f.p.s., and at least about 1,800 to 2,000 g.p.m., for a molten steel slag input rate of 7–8 tons per minute.

23. A method of handling molten slag comprising: pouring molten slag into a receptacle; injecting at least one jetstream of water into said receptacle to intercept said molten slag and to granulate the molten slag into particles; maintaining water accumulating in said receptacle at a level below said jetstream while said molten slag is being poured into the receptacle so that the molten slag intercepts said jetstream above said accumulated water; removing resultant granulated slag particles from said receptacle while the granulation of the molten slag is in progress; and transporting the granulated slag particles away from said receptacle by pumping the same through a conduit in the form of a water/slag slurry.

24. An apparatus as defined in claim 19 wherein said hydraulic transfer means removes said water and granulated slag slurry from said granulator means at substantially the average rate of input into said granulator means of water plus slag, and wherein said slurry transfer means includes means for varying the water content of said slurry to maintain a slurry velocity of at least about 17 feet per second during transport away from said granulator.

25. An apparatus as defined in claim 24 wherein said hydraulic transfer means includes means for varying the water content of said slurry to maintain up to about 17 percent granulated slag to water ratio for said slurry subject to 50 percent surge increase thereof at said slurry velocity.

26. An apparatus as defined in claim 25 further comprising means for controlling the temperature of the granulated slag slurry to maintain said slurry at a maximum temperature of less than about 180° F. to −212° F.